United States Patent [19]

Santucci et al.

[11] Patent Number: 5,235,136
[45] Date of Patent: Aug. 10, 1993

[54] ONE-PIECE RECLOSABLE CABLE AND WIRE DUCT

[75] Inventors: Donald G. Santucci; Mark Page, both of Naperville; Mark N. Cohen, Schaumburg, all of Ill.

[73] Assignee: DEK, Inc., St. Charles, Ill.

[21] Appl. No.: 735,089

[22] Filed: Jul. 24, 1991

[51] Int. Cl.⁵ .............................................. H02G 3/04
[52] U.S. Cl. .................. 174/68.3; 174/72 C; 174/101
[58] Field of Search ............ 174/68.3, 72 C, 72 R, 174/95, 97, 101; 138/115, 116, 117

[56] References Cited

U.S. PATENT DOCUMENTS

| | | | |
|---|---|---|---|
| 3,786,171 | 1/1974 | Shira | 174/72 C |
| 3,939,620 | 2/1976 | Bero | 52/716 |
| 4,248,018 | 2/1981 | Casamayor | 52/202 X |
| 4,602,124 | 7/1986 | Santucci | 174/101 |
| 4,629,826 | 12/1986 | Thomas | 174/99 R |
| 4,857,670 | 8/1989 | Frank et al. | 174/68.3 |
| 4,953,735 | 9/1990 | Tisbo et al. | 174/68.3 X |

FOREIGN PATENT DOCUMENTS

| | | | |
|---|---|---|---|
| 2608329 | 6/1988 | France | 174/68.3 |
| 609177 | 2/1979 | Switzerland | 174/68.3 |

*Primary Examiner*—Morris H. Nimmo
*Attorney, Agent, or Firm*—Maksymonko & Slater

[57] ABSTRACT

A one-piece reclosable ducting system for electrical wiring or the like. The duct system includes an elongated channel and a mating channel cover. The channel and channel cover are formed as integral members in a dual-durometer plastics co-extrusion process. More specifically, the channel and channel cover are maintained in operative relationship along respective first edges by a flexible plastic hinge, again, co-extruded with the channel and cover. The flexible plastic hinge permits repeated access and closure of the channel without hinge fatigue. A cantilever tension arm or support beam is integrally formed in the ducting system and extends from the channel to bias and retain the channel cover in proper orientation thereby assuring latching of the cover while simultaneously maintaining overall ducting system structural integrity.

9 Claims, 1 Drawing Sheet

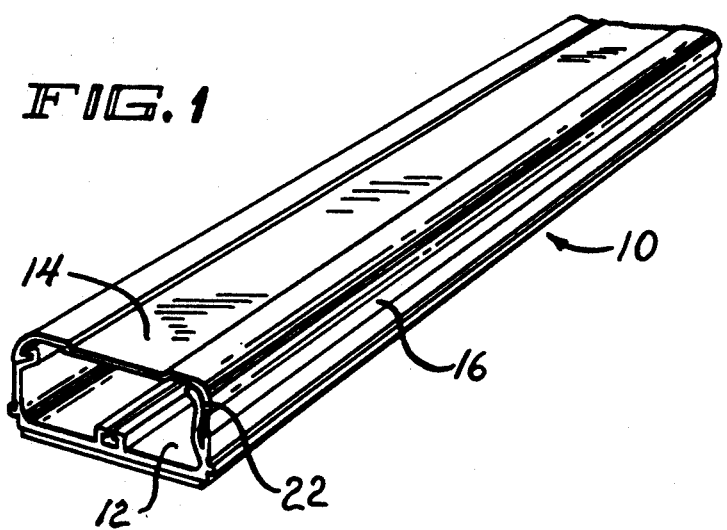
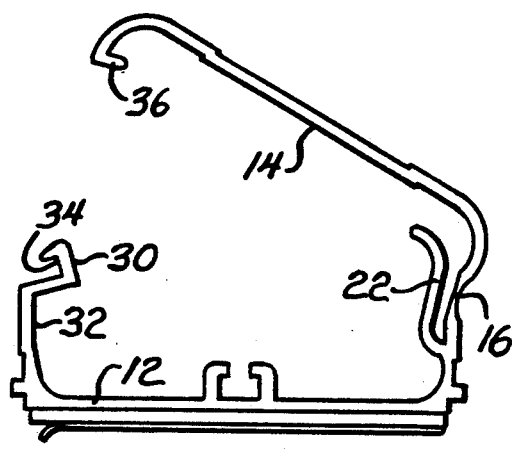
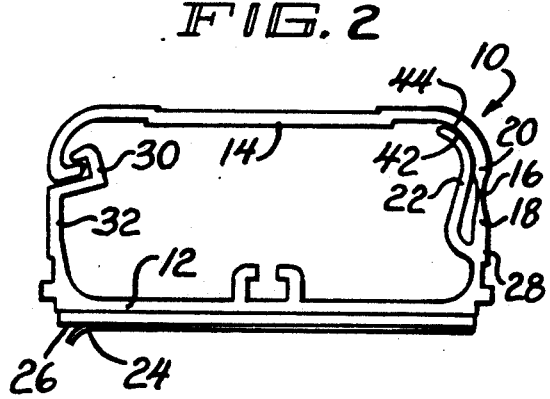
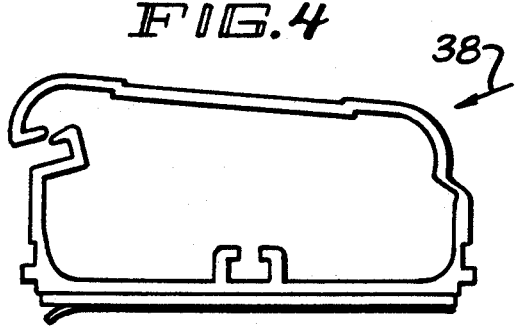
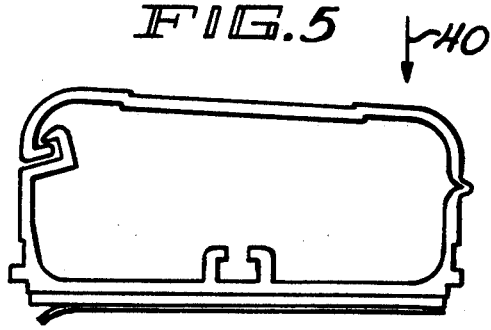

ONE-PIECE RECLOSABLE CABLE AND WIRE DUCT

BACKGROUND OF THE INVENTION

The present invention relates generally to duct systems for the containment of electrical wiring, conduits, or other similar objects and, in particular, to an improved one-piece plastic duct system in which the duct channel cover is integrally formed and attached to the wiring channel by a flexible plastic hinge member. Importantly, the present duct system facilitates repeated access and closure of the duct channel without physical fatigue of the cover-to-channel hinge attachment member.

The present invention represents an improvement over applicant's earlier plastic duct system described in U.S. Pat. No. 4,602,124. This latter duct system, the disclosure of which is hereby incorporated by reference, describes a conventional two-piece duct arrangement whereby the cover forms a second detachable member that is removable from, but snaps over the first channel member to effect closure. Although not forming a part of this invention, it is contemplated that the present duct system may advantageously employ the same duct system interface and terminal components described in the above patent and therefore reference is made to that patent for those having interest in duct system interfaces and terminations.

Although one-piece duct systems are known, each of the known systems exhibits deficiencies that renders the respective structure unsuitable as a repeated access channel system. For example, in one system the channel and channel cover are integrally extruded. These members are interconnected by a thin hinge section—also forming part of the integral extrusion—and fabricated from the same relatively rigid plastic material forming the associated channel and cover. The hinge is made "thin" to secure the desired flexibility.

This system performs acceptably as long as repeated access to the duct channel is not required as, by way of example, when additional cables or cable rewiring is attempted. Although new wiring installations can often be planned and effected with a single duct access, it is not uncommon in such instances that changing circumstances dictate subsequent modification—i.e. the removal, addition, or rerouting of wires and cables—with its corresponding repeated flexure of the thin hinge material. Hinges extruded from the same material as that of the channel and cover are inherently brittle and fatigue after relatively few closure cycles. Any failure of the hinge, i.e. by the cracking separation thereof, quickly propagates along the entire longitudinal distance of the extrusion thereby rendering further use of the duct channel impossible.

The present system, by contrast, does not employ a thin hinge member fabricated of the same rigid plastic material defining the basic channel and cover. Rather, a co-extrusion process is employed whereby the channel, cover, and hinge are all simultaneously extruded as a single integral structure, but where dual-durometer materials are employed permitting a hinge of a more flexible, lower durometer plastic composition to be incorporated. Such material is inherently more flexible and is suitable for a large number of flexures. In this manner repeated access to the duct system may be achieved without the corresponding system failures common with single material extrusion designs.

The use of lower durometer hinge materials, however, has not heretofore met with complete success—such use generating its own unique set of deleterious effects resulting in a less than satisfactory duct system. These effects are attributable to the very flexure property of low such durometer material that renders it suitable as a hinge material in the first instance. Low durometer hinges have been observed to flex both in the transverse lateral and downward modes. Such flexure can result in improper latching of the duct cover and channel (i.e. maintenance of the "closed" condition of the duct system) as well as the compression of duct upon inadvertent duct contact, for example, through movement of furniture or striking by persons walking nearby. Such compression may cause visually observable distortions to the duct (i.e. aesthetically displeasing) as well as compromising or aggravating the above-noted latching problem.

The present one-piece duct arrangement adopts the advantages of multiple access afforded by dual-durometer extrusion but largely eliminates the associate difficulties through the use of a longitudinally extending cantilever tension arm or support member. This member is integrally extruded of the higher durometer plastic material defining the channel and cover and extends upwardly from the channel adjacent the hinge. This cantilever support member provides a lateral bias to the channel cover when such cover is in its closed orientation thereby overcoming the inherently weak hinge material to provide a corresponding locking bias between the cover and channel latching members. In this manner the channel cover is held in the latched condition with substantially the same force as would have been obtained from a high durometer, non-flexible hinge, but without the multiple flexure fatigue problems associated therewith.

Further, the support member may extend upwardly to a point immediately below the inner surface of the channel cover thereby serving as support against the downward compression of the cover upon inadvertent contact therewith. In this manner, the overall rectangular cross-sectional configuration of the duct system is maintained, in turn, precluding the above-noted aesthetic and structural latching problems associated with duct compression.

It is therefore an object of the present invention to provide a one-piece plastic duct system in which the user need not separately handle the duct channel cover and in which the channel cover integrally comprises an overall duct system including the duct channel itself.

It is a further object that the present one-piece duct system facilitate substantially unlimited access in which the cover may be opened and reclosed numerous times thereby permitting reconfiguration of the wiring and cables therein. And it is therefore an object that the a hinge arrangement be provided between the respective channel and cover members and, further, that such hinge be integrally formed with said members and not fatigue or otherwise break upon multiple opening and closing cycles of the duct system.

It is yet another object of the present one-piece duct system that the duct remain properly closed and latched and that the general cross-sectional contour and duct appearance remain substantially unchanged during normal usage.

Various other objects and advantages of the invention will hereinafter become more fully apparent from the following description of the embodiments and the drawings wherein:

FIG. 1 is a perspective view of the present one-piece duct system illustrating the cantilevered duct bias and supporting beam thereof;

FIG. 2 is a front elevation view of the duct of FIG. 1 illustrated in the closed position;

FIG. 3 is a front elevation view of the duct of FIG. 1 illustrated in the open position;

FIG. 4 is a front elevation view of a duct system not incorporating the supporting beam of the present invention and illustrating latch failure; and, FIG. 5 is a front elevation view of the duct system of FIG. 4 illustrating duct compression.

DESCRIPTION OF THE PREFERRED EMBODIMENT

As best illustrated in FIGS. 1-3, the present one-piece reclosable duct system 10 comprises a wire containment channel 12 interconnected to a mating channel cover 14 through an integral elongated flexible hinge 16. The hinge bridges respective channel and cover first edges 18 and 20 and serves both to retain cover 14 in proper orientation on, and adjacent to, channel 12 as well as facilitating the pivotal rotation of the cover between channel closed (FIG. 2) and channel open (FIG. 3) conditions. The cover is further maintained in proper orientation by the cantilever supporting beam 22 discussed in more detail below.

A double-sided tape or other adhesive 24 may advantageously be affixed to the bottom portion 26 of channel 12 to permit effortless and substantially instantaneous mounting of the duct system along, for example, a wall or flooring.

The present one-piece duct system is fabricated as an integral unity employing a dual-durometer plastics co-extrusion process. More specifically, a cross-head device is employed to link a pair of extruders to a single die. One of the extruders supplies the relatively higher durometer PVC plastic that forms the correspondingly more rigid channel 12 (including supporting beam 22) and cover 14 members of the duct system while the second extruder provides a lower durometer PVC material that defines the flexible hinge 16.

With specific reference to FIGS. 2 and 3, the previously noted cantilever supporting beam 22 is shown extending upwardly from one of the channel sidewalls 28. A generally U-shaped latch member 30 is formed along the upper edge of the other sidewall 32 and includes a recess 34 adapted to lockingly receive a mating hook 36. Hook is integrally extruded as part of the channel cover 14 and extends inwardly from the distal edge of the cover (distal being defined in relationship to the hinge edge of cover 14). FIG. 2 illustrates the duct in a proper closed and latched condition with hook 36 seated in recess 34.

FIGS. 4 and 5 illustrate separate distortion modes that have been found to occur in the absence of the cantilever support beam of the present invention. In each case, the low-durometer material that forms the flexible hinge 16 is shown deformed. Such deformation may result from inadvertent physical engagement with the duct as not-uncommonly occurs during ordinary occupancy of the home, office or other installed environment.

FIG. 4 depicts duct system distortion occasioned through the application of lateral pressure applied, as illustrated by arrow 38, against the duct channel cover 14. This pressure precipitates lateral flexure of the hinge and a corresponding movement of the cover which as shown may cause the unlatching and opening of the duct system, in turn, the exposure and possible escape of wiring therein. In FIG. 5, a downward force (arrow 40) may collapse the duct potentially resulting in duct unlatching, damage to interior cables and cable retention clips and, in any event, causing a visually displeasing perspective particularly in the vicinity of inter-duct connector elements which are themselves fabricated of a single durometer rigid PVC plastic and therefore not subject to corresponding deformations.

As previously noted, it is against these deleterious effects associated with unscheduled hinge flexure that the supporting beam 22 finds particular application. In this regard, it should be recognized that the flexible hinge material cannot simply be removed to overcome such adverse properties in view of the underlying design objective that the one-piece duct system withstand multiple duct access cycles. In short, such material substitution, while obviating the above-noted duct distortion problems, merely replaces one set of adverse features with another.

FIG. 2 best illustrates the pertinent structural details of the supporting beam 22. Importantly, by reason of its extrusion from the relatively higher durometer PVC material and its cantilever configuration, the upper region 42 of the beam may be urged laterally and, when so flexed, produces a corresponding counter-bias against the flex-causing object. More specifically, beam 22 is preferably extruded such that its unbiased, quiescent orientation (FIG. 2) defines an interference relationship with the channel cover 14 when the cover is in the closed position. Thus, as the cover is moved from its open to closed positions (i.e. from the position of FIG. 3 to that of FIG. 2), the cover engages beam 22 correspondingly forcing it to the left. Beam 22 therefore provides a counter, rightward bias against the channel cover 14 thereby precluding or minimizing the possibility of the unlatching deformation shown in FIG. 4.

Further, beam 22 is preferably dimensioned to engage the inside surface of the channel cover at 44 when the duct system is in its closed condition (FIG. 2). Beam 22 thereby serves as additional support for the cover, specifically, resisting any downward force on the cover in the region adjacent hinge 16, in turn, greatly increasing the force necessary to effect objectionable duct system deformation.

It will be appreciated from the above description that the present invention defines an efficacious one-piece duct system permitting substantially unlimited duct access cycles, but without the deleterious effects of visual channel deformation or duct unlatching.

We claim:

1. A one-piece duct system for wires and the like comprising an elongated duct channel and an elongated duct channel cover, a flexible hinge integrally formed and interconnecting the channel and cover whereby the channel and cover may be reciprocated plural times between first duct system access and second duct system closed positions; independent means for supporting the cover when the duct system is in the closed position, the supporting means extending from the duct channel proximal to the hinge and into operative engagement with the cover when the cover is in the closed position, and the supporting means being elastically deformable and deformed when the cover is closed whereby a biasing force is applied to the cover to restrict cover deformation and unlatching.

2. The one-piece duct system of claim 1 in which the biasing force is a lateral force transverse to the elongate axis of the duct channel and parallel to the channel bottom portion thereby resisting the corresponding lateral movement and unlatching of the cover.

3. The one-piece duct system of claim 1 in which the biasing force is an upward force transverse to the elongate axis of the duct channel and perpendicular to the channel bottom portion thereby resisting a corresponding opposed downward movement and unlatching of the cover.

4. The one-piece duct system of claim 1 in which the biasing force includes an upward force transverse to the elongate axis of the duct channel and perpendicular to the channel bottom portion and a lateral force transverse to the elongate axis of the duct channel and parallel to the channel bottom portion thereby resisting respective downward movement and lateral cover movements and the unlatching thereof.

5. A one-piece duct system for wires and the like comprising an elongated duct channel and an elongated duct channel cover, a flexible hinge integrally formed and interconnecting the channel and cover whereby the channel and cover can be reciprocated plural times between first duct system access and second duct system closed positions; independent support means affixed to the duct channel for engaging the cover when the cover is in the second duct system closed position, the supporting means extending from the duct channel proximal to the hinge and into operative engagement with the cover when the cover is in the closed position, and the supporting means being elastically deformable and deformed when the cover is urged from its system closed position thereby applying a biasing force to the cover to restrict cover movement and unlatching whereby undesired deformations of the flexible hinge and duct system may be avoided.

6. The one-piece duct system of claim 5 in which the support means is an elongated cantilever member affixed to the duct channel generally adjacent the hinge whereby undesired deformations of the flexible hinge and duct system may be avoided.

7. A one-piece duct system for wires and the like comprising an elongated duct channel and an elongated duct channel cover, the channel being of generally U-shaped cross-section having a bottom portion and first and second sidewalls, a flexible hinge integrally formed and interconnecting the channel and cover whereby the channel and cover can be reciprocated plural times between first duct system access and second duct system closed positions; independent means for supporting the cover, the support means including an elongated cantilever member affixed at a first edge thereof to the first duct channel sidewall and extending upwardly therefrom, the support means being elastically deformable and oriented whereby movement of the cover to the duct closed position causes engagement between the cover and support means whereby the support means applies a biasing force to the cover thereby serving to inhibit undesired hinge and duct deformations.

8. A one-piece duct system for wires and the like comprising an elongated duct channel and an elongated duct channel cover, the channel being of generally U-shaped cross-section having a bottom portion and first and second sidewalls, a flexible hinge integrally formed and interconnecting the channel and cover whereby the channel and cover can be reciprocated plural times between first duct system access and second duct system closed positions; latch means for maintaining the duct system in the second closed position; independent means for supporting the cover, the support means being an elastically deformable elongated cantilever member affixed at a first edge thereof to the first duct channel sidewall and extending upwardly therefrom, the support means being oriented whereby movement of the cover to the duct closed position causes the inward lateral movement of support means whereby the support means thereby applies a laterally outward bias on the cover to inhibit undesired hinge deformation and opening of the latch means.

9. The one-piece duct system of claim 8 in which the support means is further oriented whereby the upward distal second edge thereof is proximal to the duct cover when the duct system is in the second closed position whereby the support means engages and supports the cover against downward deformations.

* * * * *